United States Patent
Younis

(10) Patent No.: US 10,721,689 B2
(45) Date of Patent: *Jul. 21, 2020

(54) BALANCED WIRELESS DATA TRANSMISSION

(71) Applicant: SHENZHEN GOODIX TECHNOLOGY CO., LTD., Shenzhen OT (CN)

(72) Inventor: Waleed Younis, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/140,511

(22) Filed: Sep. 24, 2018

(65) Prior Publication Data

US 2019/0141636 A1  May 9, 2019

Related U.S. Application Data

(63) Continuation of application No. 15/807,586, filed on Nov. 9, 2017, now Pat. No. 10,085,216.

(51) Int. Cl.
*H04B 7/00* (2006.01)
*H04W 52/02* (2009.01)
(Continued)

(52) U.S. Cl.
CPC ...... *H04W 52/0251* (2013.01); *H04R 1/1016* (2013.01); *H04R 1/1041* (2013.01);
(Continued)

(58) Field of Classification Search
CPC ..... H04W 84/20; H04W 88/00; H04W 88/02; H04W 88/06; H04W 4/80
(Continued)

(56) References Cited

U.S. PATENT DOCUMENTS 6,240,472 B1* 5/2001 Hu .................. G06F 13/387
                                                  710/2
7,379,447 B2* 5/2008 Dunagan .............. H04W 8/245
                                                  370/324
(Continued)

FOREIGN PATENT DOCUMENTS

CN       103002065 A    3/2013
CN       107071618 A    8/2017
(Continued)

OTHER PUBLICATIONS

EP Office Action dated Jun. 26, 2019 in the corresponding EP application(application No. 18768747.0).
(Continued)

*Primary Examiner* — April G Gonzales
(74) *Attorney, Agent, or Firm* — Kilpatrick Townsend & Stockton LLP

(57) ABSTRACT

Embodiments can provide concurrent (or substantially concurrent) wireless communication that can achieve load and/or battery consumption balance between or among a set of wireless devices. In wireless transmission, each receiving device is typically identified by an address or an ID, which can be used for device identification and wireless configuration over wireless link. Under the concurrent wireless transmission in accordance with the embodiments, a secondary device can "impersonate" the primary device by assuming an ID or address assigned to primary device. In this way, load and/or battery consumption balance can be achieved among multiple wireless devices in the concurrent wireless transmission.

18 Claims, 10 Drawing Sheets

(51) Int. Cl.
*H04W 4/80* (2018.01)
*H04R 1/10* (2006.01)
*H04W 84/20* (2009.01)
*H04W 88/04* (2009.01)

(52) U.S. Cl.
CPC ........... *H04W 4/80* (2018.02); *H04R 2420/07* (2013.01); *H04W 84/20* (2013.01); *H04W 88/04* (2013.01); *Y02D 70/00* (2018.01); *Y02D 70/144* (2018.01)

(58) Field of Classification Search
USPC ............................................... 455/41.2, 41.3
See application file for complete search history.

(56) References Cited

U.S. PATENT DOCUMENTS

| | | | | |
|---|---|---|---|---|
| 8,744,367 | B2* | 6/2014 | Gerber | H04W 76/38 455/67.11 |
| 8,787,323 | B2* | 7/2014 | Laroia | H04L 5/0035 370/336 |
| 9,742,866 | B2* | 8/2017 | Shribman | H04L 67/06 |
| 9,854,405 | B2* | 12/2017 | Yoo | H04W 4/027 |
| 2007/0274275 | A1* | 11/2007 | Laroia | H04L 5/0035 370/338 |
| 2007/0274276 | A1* | 11/2007 | Laroia | H04L 5/0035 370/338 |
| 2007/0291714 | A1* | 12/2007 | Laroia | H04L 5/0035 370/338 |
| 2007/0291715 | A1* | 12/2007 | Laroia | H04L 5/0035 370/338 |
| 2008/0002648 | A1* | 1/2008 | Laroia | H04L 5/0035 370/338 |
| 2008/0031193 | A1* | 2/2008 | Laroia | H04L 5/0035 370/331 |
| 2008/0039066 | A1* | 2/2008 | Laroia | H04L 5/0035 455/422.1 |
| 2009/0059841 | A1* | 3/2009 | Laroia | H04L 5/0035 370/328 |
| 2011/0006877 | A1* | 1/2011 | Franklin | H04B 10/1141 340/3.9 |
| 2011/0255414 | A1* | 10/2011 | Chen | H04W 8/005 370/241 |
| 2013/0316642 | A1 | 11/2013 | Newham | |
| 2013/0343283 | A1* | 12/2013 | Laroia | H04L 5/0035 370/328 |
| 2014/0228040 | A1* | 8/2014 | Gerber | H04W 76/38 455/450 |
| 2015/0067819 | A1* | 3/2015 | Shribman | H04L 65/4084 726/12 |
| 2016/0021485 | A1* | 1/2016 | Sallas | H04W 40/02 455/41.3 |
| 2016/0088566 | A1* | 3/2016 | Ur | H04W 52/0251 455/574 |
| 2017/0013342 | A1 | 1/2017 | Watson et al. | |
| 2017/0251440 | A1* | 8/2017 | Gilson | H04W 4/80 |
| 2017/0311105 | A1 | 10/2017 | Hariharan et al. | |

FOREIGN PATENT DOCUMENTS

| | | |
|---|---|---|
| CN | 107205192 A | 9/2017 |
| CN | 206524928 U | 9/2017 |
| CN | 107257516 A | 10/2017 |
| EP | 3101910 A1 | 12/2016 |

OTHER PUBLICATIONS

EP Office Action dated Jun. 9, 2020 in the corresponding EP application(application No. 18768747.0).

* cited by examiner

Time: T

BALANCED WIRELESS DATA TRANSMISSION

TECHNICAL FIELD

The embodiments herein generally relate to wireless communication to multiple receiving components.

BACKGROUND

Transmitting data wirelessly is generally known in the art. In some applications, data may need to be sent to multiple devices concurrently over a wireless link. Protocols have been designed to achieve such concurrent wireless data transmission. One of the common implementations of those protocols is the broadcast/multicast schemes where the same data is sent to all devices simultaneously. In such protocols, no feedback is provided from the devices to the data source. Another way for sending the data is to designate one of the devices as a primary device and one or more other devices may be designated as secondary device(s). In those protocols, data may be sent to the primary device wirelessly first; and after receiving the data, the primary device may forward the data to the secondary device(s). In addition to the data, the primary device can send additional control or synchronization information to the secondary device(s).

Wireless earbuds are one example application that uses concurrent wireless transmission protocol mentioned above. A pair of wireless earbuds typically includes a right earbud and a left earbud. Typically, wireless earbuds employ Bluetooth to receive audio data from a master device—for example, a smartphone, a tablet, a laptop or a desktop computer. Either the right or left earbud is designated as the primary earbud that will receive data from the master device and forward the data to the other earbud.

SUMMARY

Embodiments can provide concurrent (or substantially concurrent) wireless communication that can achieve load and/or battery consumption balance between or among a set of wireless devices. As used herein, "load balance" may be referred to efficiently or evenly distributing the responsibilities attributed to the primary wireless device in the traditional concurrent wireless transmission across individual wireless devices in this set. As used herein, the term "current" may be referred to occurrence at the same or substantially at the same time. Among other benefits, the balanced concurrent wireless communication in accordance with the disclosure can improve battery life, data processing performance, communication performance, and/or any other benefits for the individual wireless devices in the set. In some embodiments, a wireless device configured to employ the concurrent wireless transmission in accordance with the disclosure can include a communication component, a storage component, a data processing component, a control component, a synchronization component, and/or any other components.

The communication component can be configured to wirelessly communicate with a transmission device and a peer wireless device. The transmission device may include a wireless transmitter, a base station, a smartphone, a tablet, a laptop computer, a desktop computer, and/or any other type of transmission device that may transmit wireless data concurrently to the wireless devices in the set. The wireless communication with the transmission device by the communication component can include receiving data from the transmission device and communicating control information with the transmission device. The wireless communication with the peer wireless device by the communication component can include transmitting data received from the transmission device to the peer wireless device, receiving data transmitted from the peer wireless device and communicating control information with the peer wireless device.

The storage component can be configured to store an identification ("ID" hereinafter) or address assigned to a primary device and an identification ("ID" hereinafter) or address assigned to a secondary device. The data processing component can be configured to process data received from the transmission device and data received from the peer wireless device. The control component can be configured to control the wireless communication with the transmission device and the peer device by the communication component. The controlling of the wireless communication with the transmission device and the peer device by the control component can includes: in a first time period, receiving the data from the transmission device using the ID or address assigned to the primary device, and transmitting the data received from the transmission device to the peer wireless device; in a second time period: using the ID or address assigned to the secondary device to receive data from the peer wireless device.

In various embodiments, one or more of the following features are provided. The control component can be further configured to control the communication component to communicate to the transmission device control information regarding data transmission with the transmission device in the first time period. The control component can be further configured to control the communication component not to communicate to the transmission device control information regarding data transmission with the transmission device. The control information communicated to the peer wireless device in the first time period can include information indicating to the peer wireless device that the wireless device uses the first identification as the communication identification with the transmission device. In some embodiments, the wireless device and the peer wireless device can be a pair of wireless earbuds. In those embodiments, the transmission device can include a wireless transmitter.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
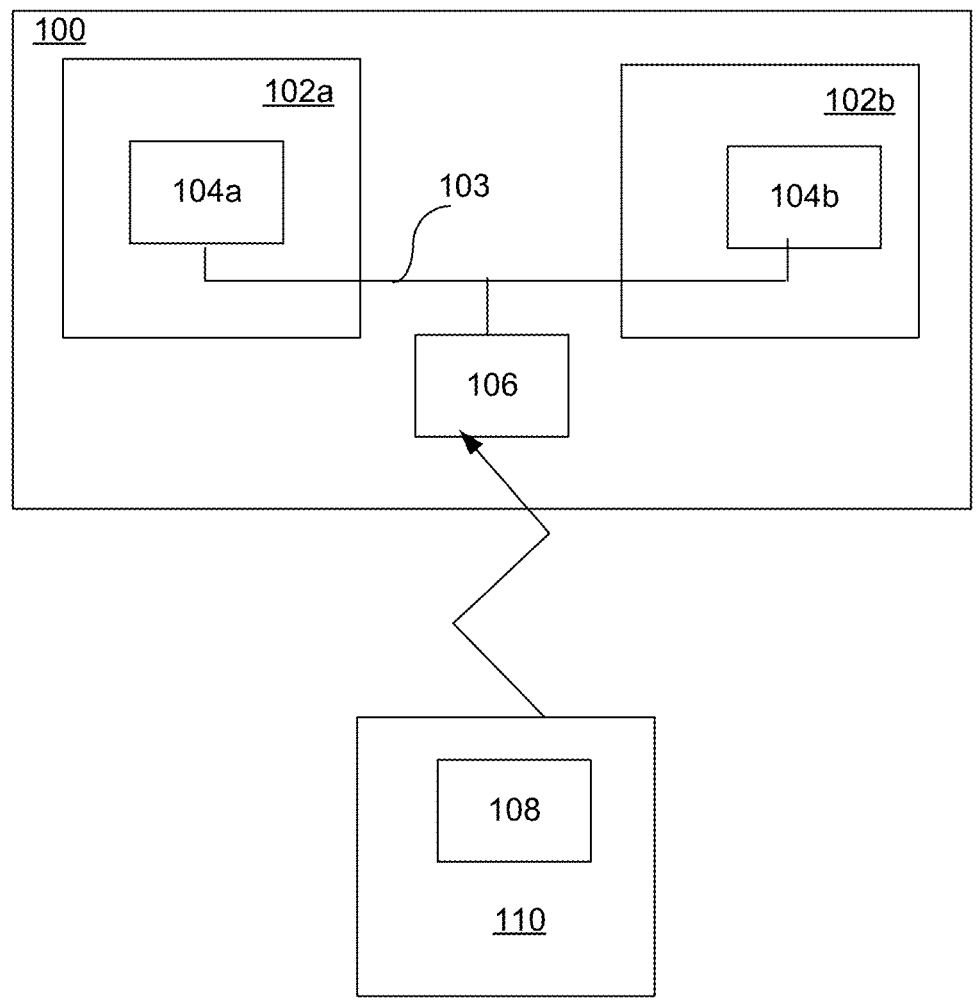
FIG. 1 illustrates one example of a centralized model for transmitting and receiving data wirelessly.

Traditional concurrent wireless transmission typically involves transmitting data wirelessly from sender to a receiver, which may then distributes data to multiple components or devices connected to the receiver. As used herein, such traditional concurrent wireless transmission may be referred to as the centralized model. FIG. 1 illustrates one example of such a model. As shown, a receiving system 100 in the centralized model may include a first component 102a, a second component 102b, a receiver 106 and/or any other components. As can be seen, the receiver 106 in the system 100 can be configured to receive data wirelessly (e.g., through a Bluetooth link) from a sender system 110. The sender system 110 can include a wireless transmitter 108. At a given time, the wireless transmitter 108 may transfer data to the sender system 110, which can receive the data through the receiver 106. The received data contains the combined data for both component 102a and 102b. A processing unit 112 in the receiving system 100 can process the data to extract the relevant data for each component. After processing the data, the processing unit 112 can distribute relevant extracted data to the first component 102a and the second component 102b concurrently or substantially concurrently, via their receivers 104a and 104b, respectively.

One example of the receiving system 100 is a tradition wireless headset. In that example, the first component 102a may correspond to a data processing component (e.g., a microchip) in the left earphone, and the second component 102b can correspond to a data processing component in the right earphone. However, it should be noted the receiving system 100 is not limited to a wireless headset. The receiving system 100 can include any system that receives data wirelessly and distributes the data to multiple components concurrently in the system 100.

Figure 2:
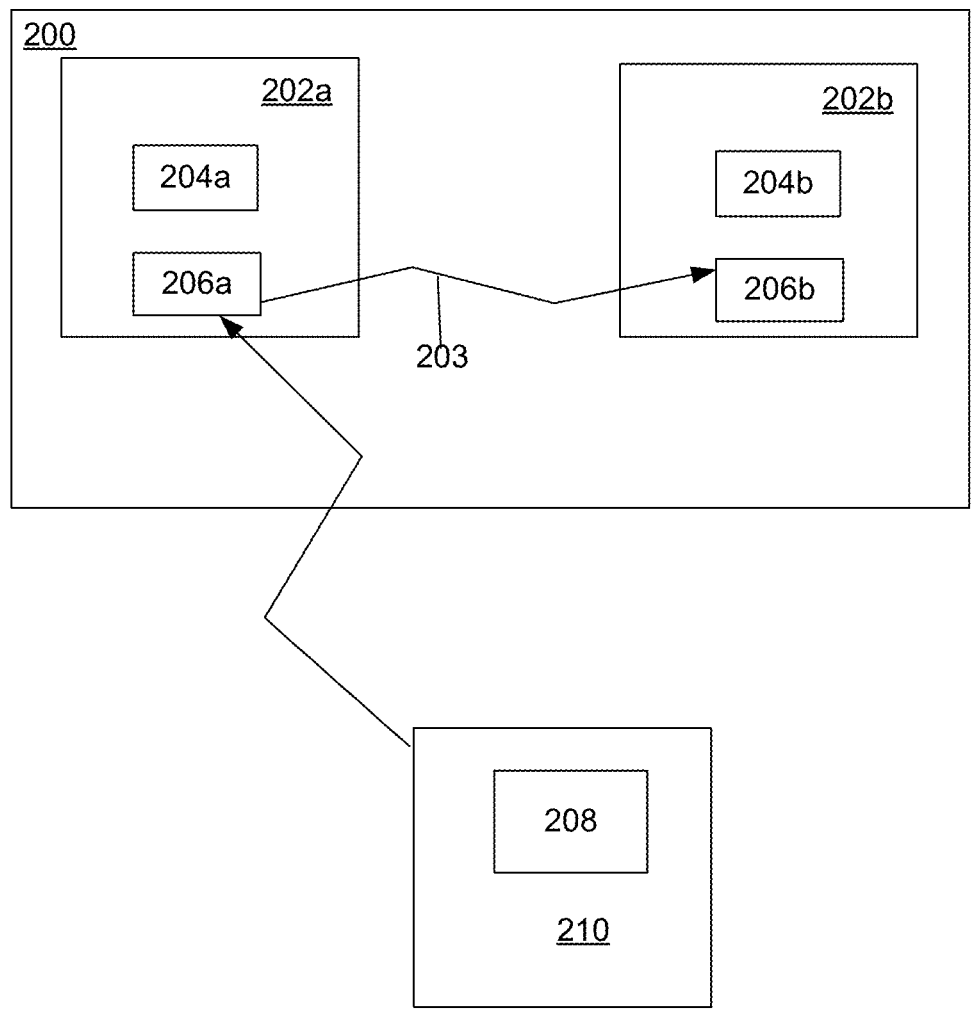
FIG. 2 illustrates an example of a distributed model for transmitting and receiving data wirelessly.

One drawback associated with the wireless receiving system 100 shown in FIG. 1 is that it typically requires a wired link 103 between the first component 104a and the second component 104b. This can be cumbersome for some applications, for example for wireless headsets. To address this drawback, wireless receiving systems with a wireless link between the first component 104a and the second component 104b has been developed. FIG. 2 illustrates an example of such a receiving system. In the receiving system 200, there is a first component 202a and a second component 202b. Different from the receiving system 100 shown in FIG. 1, the link 203 between the first component 202a and the second component 202b is wireless. In such a receiving system, one of the first and second components may be designated as a primary device for receiving data from the sending system 210 and distributing the data to the other component, which may be designated as a secondary device.

In this example, the first component 202a is the primary device and the second component 202b is the secondary device. At a given time T, the receiver 208 in the sending system 210 may transmit data wirelessly to the first component 202a, via the receiver 206a in the first component 202a. After receiving the data, the first component 202a may then relay the data wirelessly to the second component 202b via the receiver 206b in the second component 202b.

Typically, the sending system 210 sends a set of data (packets from transmission point of view) wirelessly to the receiving system 200 periodically or continuously. After the first component 202a receives the set of data each time (via the receiver 206a), it responds to the sending system 210 with acknowledgement of each received packet. The first component 202a may then forward the received packets from the sender system 210 to the second component 202b over wireless link 203. This may involve extracting payload content specific to the second component 202b and re-packaging the extracted data in new packets by the first component 202a.

Figure 3A:
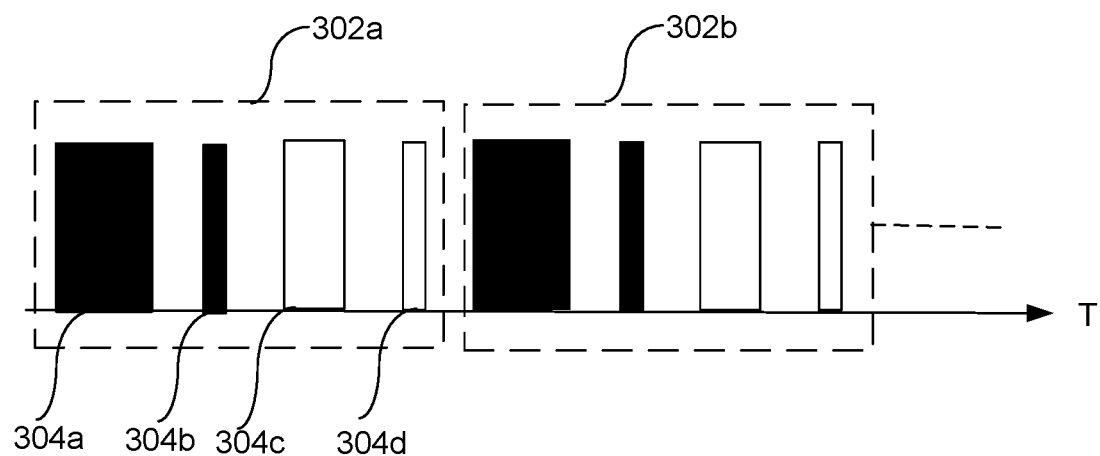
FIG. 3A illustrates an example of traditional concurrent wireless transmission where there is a wireless link between two receiving components.

FIG. 3A illustrates an example of traditional concurrent wireless transmission where there is a wireless link between two receiving components. It will be described with reference to FIG. 2. As can be seen, the first component 202a, the first component 202a may receive and transmit data packets over time T. The data packets can be logically grouped into more or less symmetric sets, e.g., set 302a and 302b as shown in this example. Each of the set 302a and 302b can include data packets received from the sending system 210, and data packets received from the second component 202b; and data packets sent to the sending system 200 and sent to the second component 202b. As can be seen from the content of 302a, in some examples, as shown in this example, such a set may include a data packet 304a received from the sender system 220 which may include a control information and payload data intended for both the first component 202a and the second component 202b. The set 302a may include an acknowledge packet 304b sent by the first component 202a back to the sender system 210. The acknowledge packet 304b may acknowledge the data packet 304a has been received by first component 202a, or may inform the sender system 210 that a timeout has occurred without receiving the data packet 304b. The set 302a may include a data packet 304c sent by the first component 202a to the second component 202b. As mentioned above, the the data packet 304c may be prepared by the first component 202a after receiving the data packet 304a. The set 302a may include an acknowledge packet received from the second component 202b indicating whether the data packet 304c has been received by the second component 202b. As can be seen, the shaded packets are performed by the sending system 210 and first component 202a, which is the primary device, and the non-shaded packets are performed by both the first component 202a and the second component 202b.

In a variation of the concurrent wireless transmission shown in FIG. 3A, the second component 202b can be configured to "sniff" or listen to the traffic between the sending system 210 and the receiving system 200. In that variation, the second component 202b may extract the payload data intended for second component 202a without needing the first component 202a to forward the payload data to it. However, in this variation, the second component 202b typically lacks information about the wireless connection parameters between the sender system 210 device and the first component 202b for a number of reasons such as frequency hopping sequence, encryption keys, timing synchronization, and other reasons. That is, the wireless transmission by the sender system 210 typically is dedicated to an identification or address of the first component 202a. Accordingly, certain control information, such as encryption keys, in order for the second component 202b to extract the payload data is still first sent, by the sender system 210, to the first component 202a. In that variation, such control information still needs to be forwarded to the second component 202b, by the first component 202a, over wireless link 203.

Figure 3B:
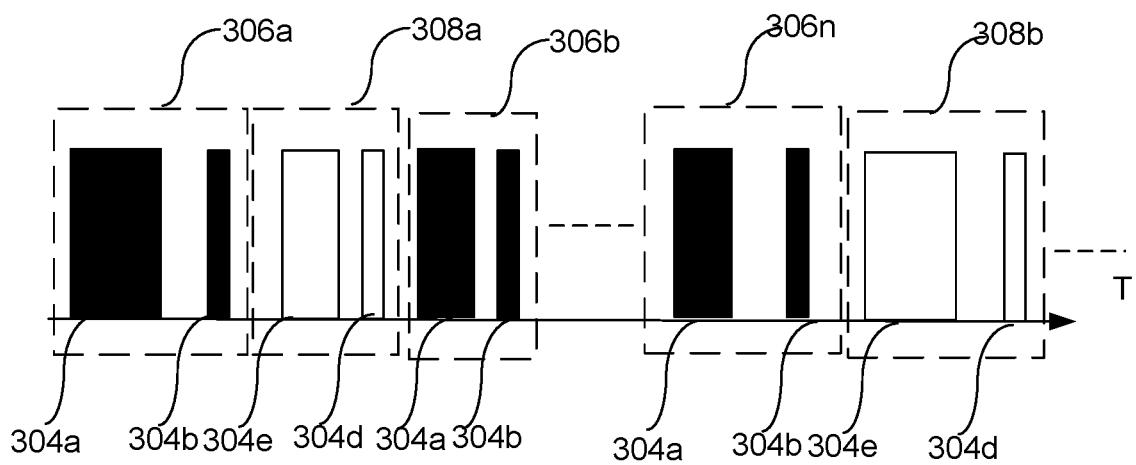
FIG. 3B illustrates an example of the variation to the traditional concurrent wireless transmission shown in FIG. 3A.

FIG. 3B illustrates an example of the variation to the traditional concurrent wireless transmission shown in FIG. 3A. As can be seen, in this variation, the first component 202a still receives data from the sending system 210 in packets 304a, and send acknowledge packets to the sending system 210 in response. Different from the concurrent wireless transmission shown in FIG. 3A is that the first component 202a need not forward data packets 304c to the second component 202b mentioned above. Instead, forward control packets 304e to the second component 202b once a while. As shown, after the packets in the set 306a are received and acknowledged, the first component 202a forwards the control packet 302e to the second component 202b and receives an acknowledge packet from the second component 202b from the second component 202b, both of which may be logically grouped as a control block 308a.

After the control block 308a, the first component 202a performs packets receiving and acknowledging with the sending system 210 through sets 306b-n without forwarding the received packets to the second component 202b, because the second component 202b has "picked up" the data packets 304a when the sender system 210 transmits the data packets to the first component 202a and knows how to extract data from the data packets 304a using the control information in the control packet 304e received from the first component 202a. As can be seen, after a while, the first component 202a may need to send the control packet 304e again (as shown in the control block 308b) to the second component 202b, when the sending system 210 updates certain control information, for example the encryption keys. As can be seen, the shaded packets are performed by the sending system 210 and first component 202a, which is the primary device, and the non-shaded packets are performed by both the first component 202a and the second component 202b In either case shown FIGS. 3A and 3B, as can be seen, the first component 202a has more responsibilities in performing the packets (transmitting, extracting, repackaging and receiving) than the second component 202b. In the case shown in FIG. 3A, the first component 202a has substantially more work to do than the second component 202b as the "broker" of the data intended for the second component 202b. In the case shown FIG. 3B, although the first component 202a need not forward the data packets 304c to the second component 202b, it still needs to forward the control packet 304e to the second component 202b frequently, resulting in more work than the second component 202b.

One insight provided by the inventor(s) is that the traditional concurrent wireless transmission requires an unbalanced responsibilities between the first component 202a and second component 202b, resulting in the first component 202a having to do more work than the second component 202b. This unbalance can result in performance issue such that the first component 202a has to do more processing than the second component 202b. This unbalance can also result in battery consumption issue such that the first component 202a drains battery faster than the second component 202b.

Figure 4:
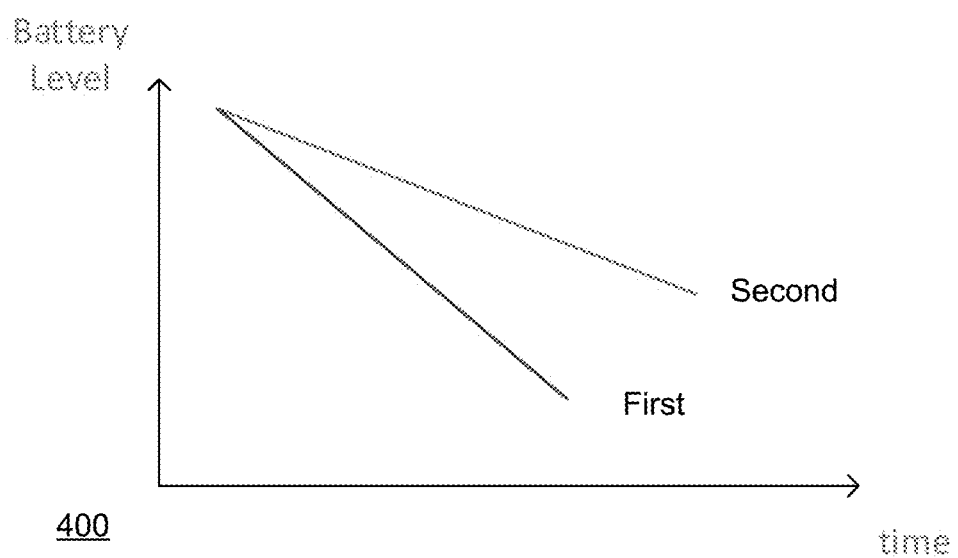
FIG. 4 illustrates the first component can drain battery power faster than the second component over time.

In some applications where concurrent wireless transmission is used, the first component 202a and second component 202b typically has a small package and has their own batteries associated with them. This is the case for wireless earbuds. FIG. 4 illustrates the first component 202a can drain battery power faster than the second component 202b over time. However, it is important to balance the battery drainage of both first component 202a and second component 202b to improve the overall operating time and performance of receiving system 200.

One way envisioned by the inventors for balancing the processing between the first component 202a and the second component 202b is to switch their roles once awhile. The first component 202a and the second component 202b may assume the role of the primary device alternatively. That is, the sending system 210 will transmit data to the first component 202a in a first time period and will transmit the data to the second component 202b in a second time period; and the wireless link 203 between the first component 202a and the second component 202b will reverse in the first and second time periods. However, this scheme requires the sending system to switch wireless connections with the first and second components in the first and second time periods. This may involve not-insignificant amount of switching and additional processing on the sending system 210 and as well as the receiving system 200, resulting in potential performance degradation, loss of connection and/or transmission delay during switching. In the case of wireless earbuds, this is not desired as audio data need be continuously sent to and processed by the earbuds without interruption.

A solution envisioned by the inventor(s) to the above-described unbalanced concurrent wireless transmission is to have the first component 202a and second component 202b "impersonate" the primary device alternatively. In wireless transmission, each receiving device is typically identified by an address or an ID, which can be used for device identification and wireless configuration over wireless link. Under the concurrent wireless transmission in accordance with the disclosure, the second component 202b can "impersonate" the primary device by assuming an ID or address assigned to primary device. One way of achieving this is that a synchronization packet can be sent, over the link 203, from the first component 202a in the first time period that the first component 202a is ready to switch the role with the second component 202b. Similarly, the second component 202b can send the synchronization packet to the first component 202a that it is the ready to switch the role back with the first component 202a. This switch should be transparent to the sending system 210 since it only knows sending data to the first component 202a using its ID or address, In this scheme, the sending system 210 continues to operate normally during the switching between the first component 202a and second component 202b.

Figure 5:
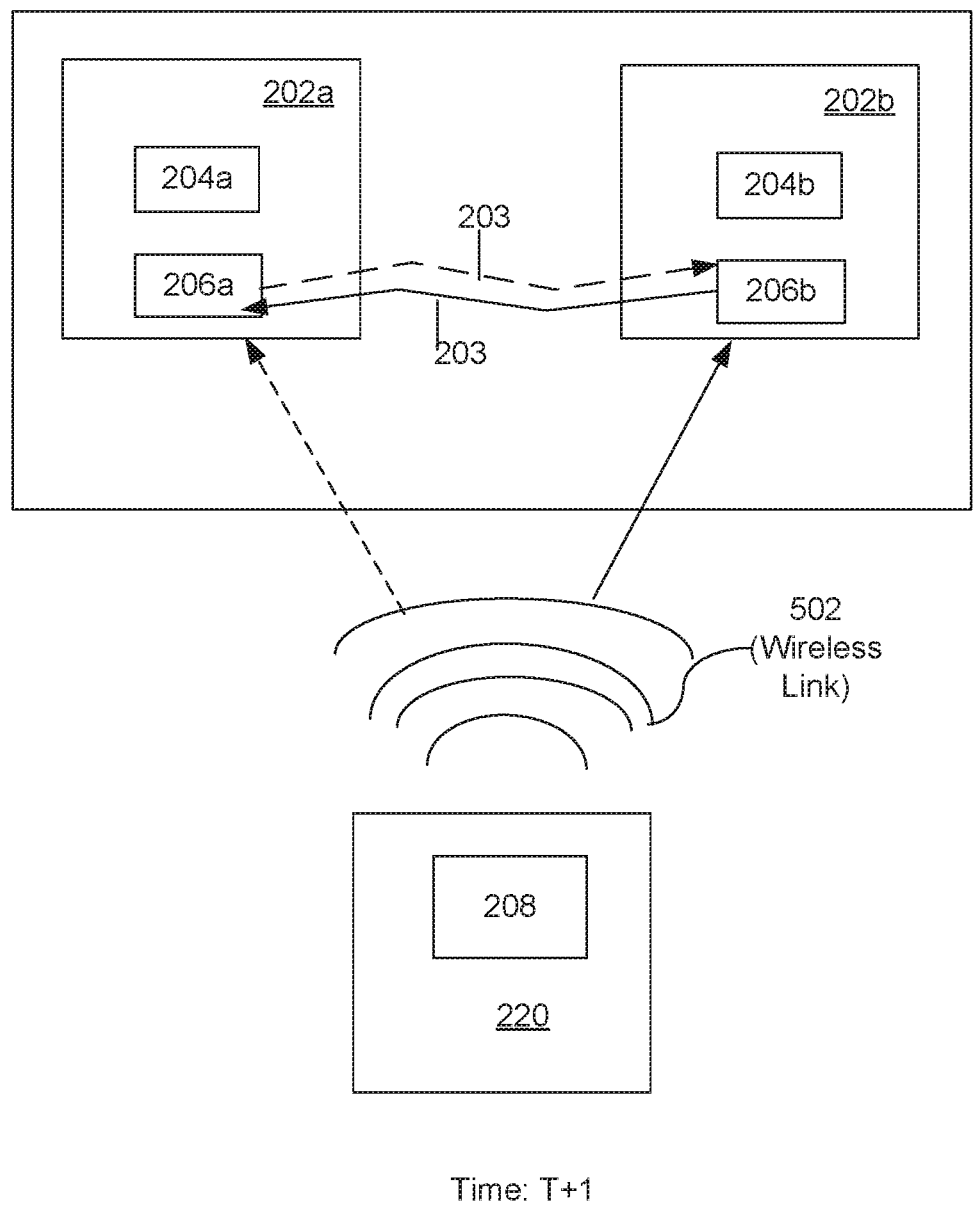
FIG. 5 illustrates generally a switchover between the first component and second component at given time T+1 in accordance with the disclosure.

FIG. 5 illustrates generally a switchover between the first component 202a and second component 202b at given time T+1 in accordance with the disclosure. The dotted arrow in this figure represents wireless links at the given time T shown in FIG. 2. As can be seen, at the given time T+1, the first component 202a and second component 202b can switch their roles such that the second component 202b assumes the ID or address assigned to the first component 202a, and the first component 202a assumes the ID or address assigned to the first component 202b at the given time T+1. As also shown, after the switch, the data intended for the first component 202a is received by the second component 202b. This is because the second component 202b "sniffs" the wireless link 502 and as soon as after the switch, it can extract data on the wireless link 502. From the sending system 210 point of view, during this switch process between the first component 202a and the second component 202b, the sending system 210 is not aware of the switch and thus continues to transmit data over the wireless link 502 to the first component 202a.

Figure 6:
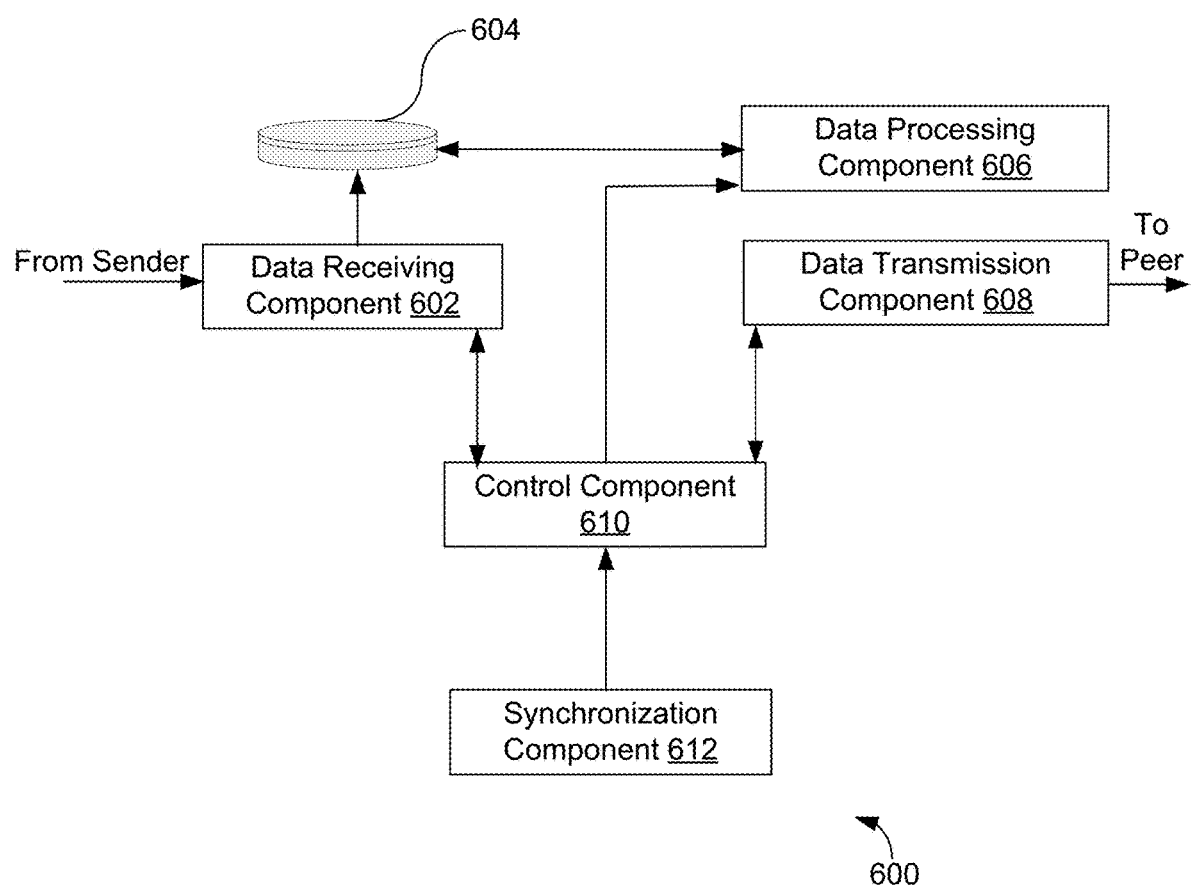
FIG. 6 illustrates one example device for balanced concurrent wireless transmission in accordance with the disclosure.

FIG. 6 illustrates one example device 600 for balanced concurrent wireless transmission in accordance with the disclosure. In implementations, the device 600 may be included in the first component 202a or second component 202b. As shown, the device 600 may include a data receiving component 602, a data processing component 606, a data transmission component 608, a control component 610, synchronization component 612, a storage component 604, and/or any other components. The data receiving component 602 may be configured to receive data over a wireless link from a sending system such sending system 210 shown in FIG. 2. In some implementations, data receiving component 602 can be configured to receive the data in dedicated mode and/or in a listen mode. In the dedicated mode, a dedicated wireless link may be established between the sending system and device 600. In the listen mode the data receiving component 602 may be configured to listen to traffic over a wireless link (either wireless link 502 or wireless link 203) to determine if the data transmitted on the wireless link is intended for device 600. In the listen model, when it is determined that the data is intended for device 600, the data receiving component 602 may extract payload data from the packets it "picked up" from the wireless link.

The data processing component 606 can be configured to process data received over wireless link 502 and/or wireless link 203. As mentioned above, there may be two modes of receiving the data wirelessly from the sending system 210. In the first mode, the data processing component 606 can be configured to listen to traffic on the wireless link 502, and extract data "picked up" from the wireless link 502 using the decryption key(s) received over wireless link 203 from a peer wireless device. In the second mode, the data processing component 606 can be configured to receive data directly from the sending system 210 over the wireless link 502. When processing data received from wireless link 502 in the first mode, data processing component 606 can be configured to extract data using one or more decryption keys received from a peer wireless device such as second component 202b shown in FIG. 2. When processing data received from wireless link 203 in the second mode, the, data processing component 606 can be configured to extract certain control information such as the decryption key(s) for transmission to a peer wireless device.

The data transmission component 608 can be configured to transmit data over the wireless link 502 and/or the wireless link 203. The data transmitted by the data transmission component 608 over the wireless link 502 can include acknowledge packets indicating that data packets transmitted by the sending system 210 have been received. The data transmitted by the data transmission component 608 over the wireless link 203 can include control information such as decryption key(s) on how to extract data from the sending system 210 and/or the actual data from the sending system 210 (in the second mode) to the peer wireless device.

The storage component 604 can be configured to store identifications (IDs) and/or addresses for one or more wireless devices. As mentioned above, the wireless device 600 may be configured to assume the role assigned to different devices in the concurrent wireless transmission in accordance with the disclosure. For facilitating this, the storage component 604 can be configured to store for example, an ID or address assigned to a primary device in the concurrent wireless transmission in accordance with the disclosure, one or more IDs or addresses assigned to one or more secondary devices in the concurrent wireless transmission in accordance with the disclosure.

The control component 610 can be configured to control the wireless receiving by the data receiving component 602, the data processing by the data processing component 606, the wireless transmission by the data transmission component 608, and/or to perform any other control functions. As mentioned above, during some time periods, the control component 610 may retrieve an ID or address assigned to the primary device and instruct the data receiving component 602 and data transmission component 608 to receive and transmit data wirelessly over link 502 and link 203 using that ID and address. In some time periods, the control component 610 may retrieve an ID or address assigned to a secondary device and instruct the data receiving component 602 and data transmission component 608 to receive and transmit data wirelessly over link 502 and link 203 using that ID and address.

The synchronization component 612 can be configured to generate a synchronization instruction to instruct the control component 610 to use a particular the ID or address assigned to the primary device, or the ID or address assigned to a secondary device in a given time period. For example, the synchronization component 612 can be configured to instruct the control component to use the ID or the address assigned to the primary device every 10 minutes for 10 minutes, and to use the ID or address assigned to the secondary device for the next 10 minutes. However, this is not necessarily the only case. In some implementations, the synchronization component 612 may be configured to receive the synchronization instruction from a peer wireless device or the sending system 210 to use a particular ID or address for wireless transmission and receiving. In those implementations, the synchronization component 612 can be configured to generate the aforementioned synchronization instruction for a peer wireless device and transmit the synchronization instruction to the peer wireless device via the data transmission component 608 over link 203.

Figure 7:
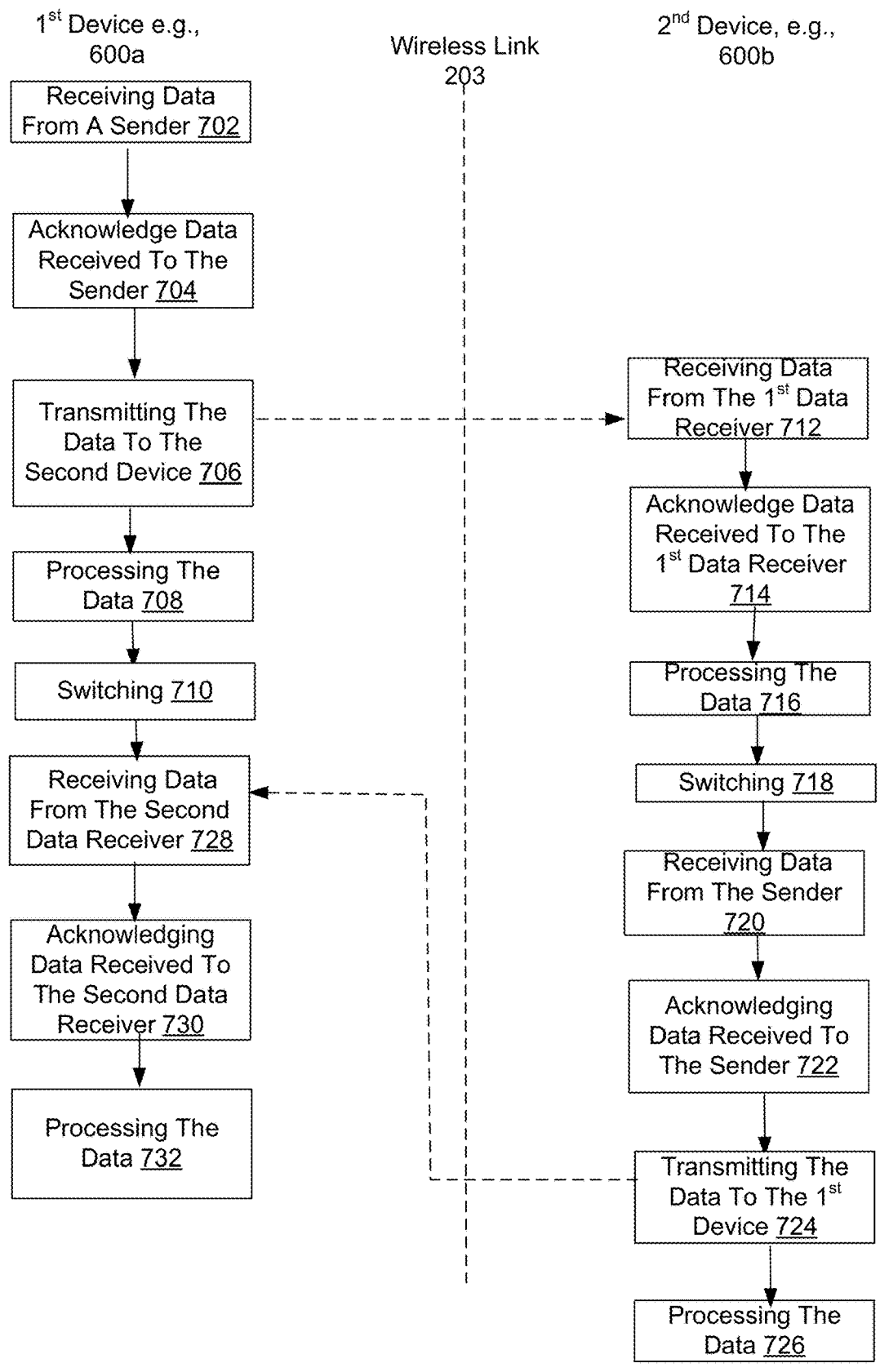
FIG. 7 illustrates an example flowchart showing concurrent wireless transmission in accordance with the disclosure.

With structure of a wireless device 600 having been generally described, attention is now directed to FIG. 7, where an example flowchart illustrating concurrent wireless transmission in accordance with the disclosure is shown. In this flowchart, two wireless devices, i.e., the first device and the second device engage in concurrent wireless transmission in accordance with the disclosure. The first device can have a structure shown in FIG. 6 and the second device can also have the structure shown in FIG. 6. The process shown in flowchart 700 starts at time T, when the first device is using the ID or address assigned to the primary device, and the second device is using an ID or address assigned to a secondary device.

At 702, the first device receives data from a sending system such as the sending system 210 shown in FIG. 2. The data receiving at 702 can be through the wireless link 502 shown in FIG. 5. Since the first device uses the ID or address assigned to the primary device at 702, it receives the data over the wireless link 502 from the sending system as the primary device. The data received at 702 may include payload data to be processed by the first device and/or payload data to be processed by the second device. The data received at 702 may include control information regarding how to extract the received payload data, such as one or more decryption keys. In some implementations, operations involved in 702 can be performed by a data receiving component in the first device the same as or substantially similar to data receiving component 602 described and illustrated herein.

At 704, the first device acknowledges whether it has received the data it is supposed to receive at 702. In some implementations, operations involved in 704 can be performed by a data transmission component in the first device the same as or substantially similar to data transmission component 608 described and illustrated herein.

At 706, the first device transmits data received at 702 to the second device over a wireless link between the two, such as wireless link 203 shown in FIG. 2. The data transmitted to second device at 706 may include payload data, from the sending system, intended for the second device, and/or control information regarding how to extract the payload data intended for the second device. In some implementations, operations involved in 706 can be performed by a data transmission component in the first device the same as or substantially similar to data transmission component 608 described and illustrated herein.

At 708, the first device processes the data received at 702. In some implementations, operations involved in 710 can be performed by a data processing component in the first device the same as or substantially similar to data processing component 606 described and illustrated herein.

At 710, the first device may switch its role from the primary device to a secondary device. The role switching at 710 may involve retrieving, from a storage unit, an address or ID assigned to the secondary device and use that address or ID as the new address or ID of the first device. In some implementations, the first device may be configured to perform the switching periodically. However, this is not necessarily the only case. In some implementations, the first device may receive a synchronization instruction, for example from a peer wireless device or a control device, to perform the switch. In some implementations, operations involved in 710 can be performed by a control component and/or a synchronization component in the first device the same as or substantially similar to control component 610 and/or synchronization component 612 described and illustrated herein.

At 712, the second device receives data transmitted by the first device at 706 over a wireless link such as wireless link 203 shown in FIG. 2. At 712, the second device uses an address or ID assigned to a secondary device for receiving data wireless. The data received by the second device at 712 may include payload data, from the sending system, intended for the second device, and/or control information regarding how to extract the payload data intended for the second device. In some implementations, operations involved in 712 can be performed by a data receiving component in the second device the same as or substantially similar to data receiving component 712 described and illustrated herein.

At 714, the second device acknowledges whether it has received the data it is supposed to receive at 712. In some implementations, operations involved in 714 can be performed by a data transmission component in the second device the same as or substantially similar to data transmission component 608 described and illustrated herein.

At 716, the second device processes the data received at 712. In some implementations, operations involved in 716 can be performed by a data processing component in the second device the same as or substantially similar to data processing component 606 described and illustrated herein.

At 718, the second device switch its role from the secondary device to the first device. In implementations, the switching by the first device at 710 and the switching by the second device at 718 can be synchronized. For example, either first device or the second device can be configured to generate a synchronization instruction to switch itself and to have the other device switch. As another example, the first device and second device can be configured to switch on its own at the same frequency. Still as another example, a control device may be employed to coordinate the first and second devices to switch at the same time by sending a switching instruction to both at the same. In some implementations, operations involved in 718 can be performed by a control component and/or a synchronization component in the second device the same as or substantially similar to control component 610 and/or synchronization component 612 described and illustrated herein.

At 720, the second device receives data from the sending system. The data receiving at 720 can be through the wireless link 502 shown in FIG. 5. Since the second device uses the ID or address assigned to the primary device at 720, it receives the data over the wireless link 502 from the sending system as the primary device. The data received at 720 may include payload data to be processed by the second device and/or payload data to be processed by the first device. The data received at 720 may include control information regarding how to extract the received payload data, such as one or more decryption keys. In some implementations, operations involved in 720 can be performed by a data receiving component in the second device the same as or substantially similar to data receiving component 602 described and illustrated herein.

At 722, the second device acknowledges whether it has received the data it is supposed to receive at 720. In some implementations, operations involved in 72 can be performed by a data transmission component in the second device the same as or substantially similar to data transmission component 608 described and illustrated herein.

At 724, the second device transmits data received at 722 to the second device over a wireless link between the two, such as wireless link 203 shown in FIG. 2. The data transmitted to second device at 724 may include payload data, from the sending system, intended for the first device, and/or control information regarding how to extract the payload data intended for the first device. In some implementations, operations involved in 724 can be performed by a data transmission component in the second device the same as or substantially similar to data transmission component 608 described and illustrated herein.

At 726, the second device processes the data received at 722. In some implementations, operations involved in 726 can be performed by a data processing component in the first device the same as or substantially similar to data processing component 606 described and illustrated herein.

At 728, the first device receives data transmitted by the s device at 24 over a wireless link such as wireless link 203 shown in FIG. 2. At 728, the first device uses an address or ID assigned to a secondary device for receiving the data. The data received by the second device at 728 may include payload data, from the sending system, intended for the second device, and/or control information regarding how to extract the payload data intended for the first device. In some implementations, operations involved in 728 can be performed by a data receiving component in the second device the same as or substantially similar to data receiving component 728 described and illustrated herein.

At 730, the first device acknowledges whether it has received the data it is supposed to receive at 728. In some implementations, operations involved in 730 can be performed by a data transmission component in the first device the same as or substantially similar to data transmission component 608 described and illustrated herein.

At 732, the first device processes the data received at 728. In some implementations, operations involved in 732 can be performed by a data processing component in the second device the same as or substantially similar to data processing component 606 described and illustrated herein.

Figure 8:
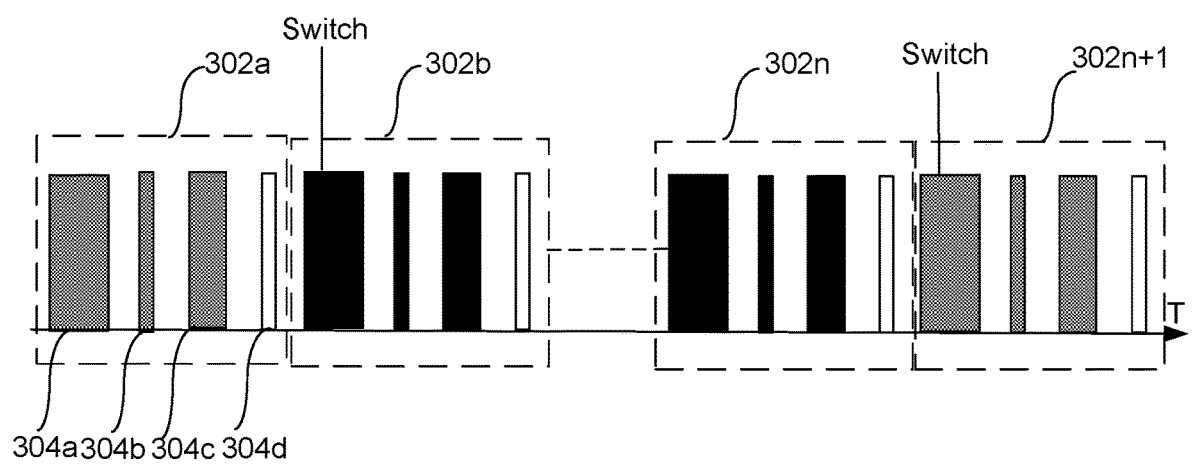
FIG. 8 illustrates a packet flow between the first and second device during switching in the concurrent wireless transmission in accordance with the disclosure

FIG. 8 illustrates a packet flow between the first and second device during switching in the concurrent wireless transmission in accordance with the disclosure. The packets flow shown in FIG. 8 is the same as FIG. 3 from the sending system point of point view. However, different from FIG. 3A is that the gray shaded packets are performed by the first device, the black shaded packets are performed by the second device, and the non-shaded packets are performed by both devices, due to the role switching between the two devices as described and illustrated herein. Accordingly, compared with FIG. 3 where the first device performs more packets transmission and receiving than the second device, the first and second devices perform equal amount of packets transmission and receiving over time T in the current wireless transmission in accordance with the disclosure.

Figure 9:
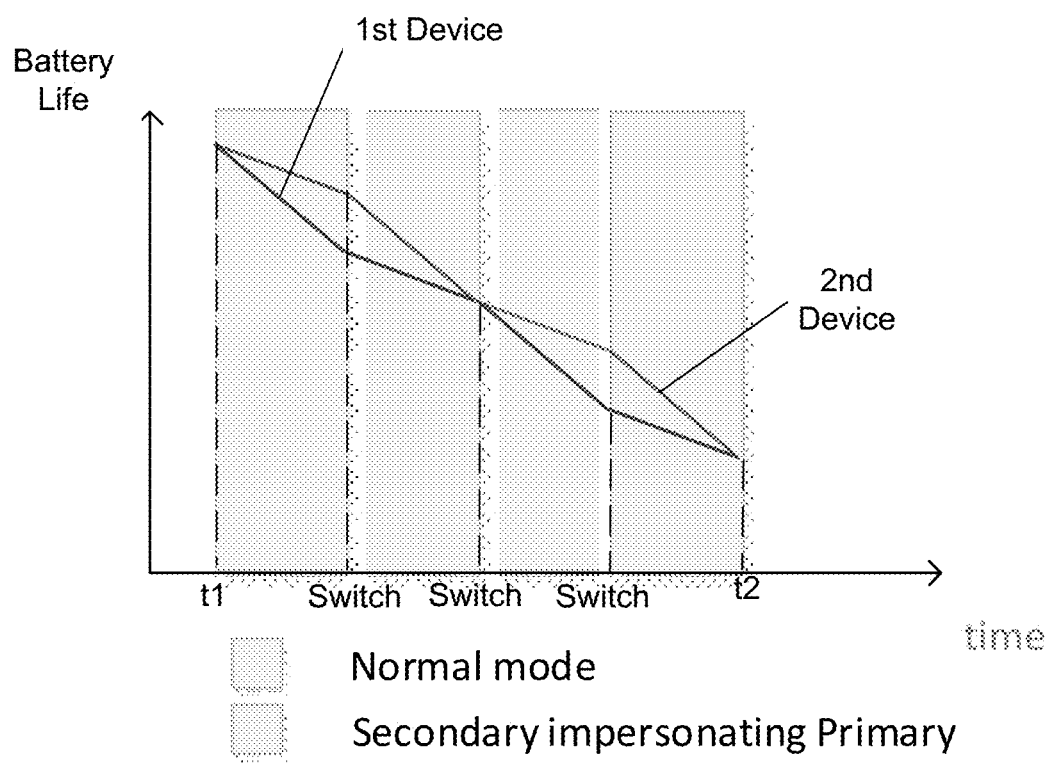
FIG. 9 shows a graph illustrating battery consumption between the first device and second device during the concurrent wireless transmission in accordance with the disclosure.

FIG. 9 shows a graph illustrating battery consumption between the first device and second device during the concurrent wireless transmission in accordance with the disclosure. As can be seen, the battery consumption by the first device initially can still be faster than the second device because the first device starts with the role as the primary device at time t1. The subsequent battery consumption will however even out as the first device and second device switch their roles during the period between t1 and t2. As shown, in the concurrent wireless transmission in accordance with the disclosure, the battery consumption by the two devices will eventually be balanced t2.

Figure 10A:
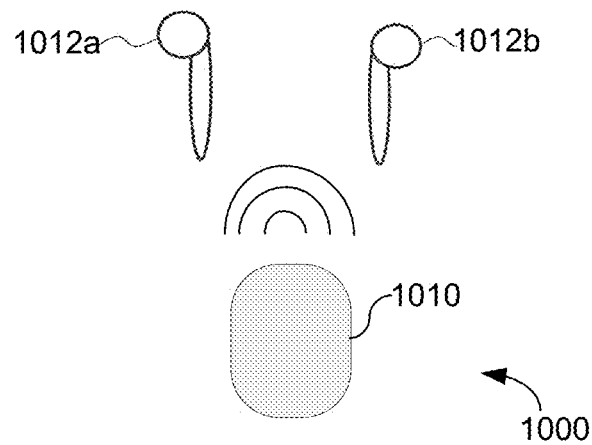
FIG. 10a illustrates an example wireless earbud system that can be configured to employ the concurrent wireless transmission in accordance with the disclosure.

FIG. 10a illustrates an example wireless earbud system 1000 that can be configured to employ the concurrent wireless transmission in accordance with the disclosure. As shown, the wireless earbud system 1000 may include a transmission device such as a USB wireless adapter, a smart phone, a laptop computer, a tablet, a desktop computer and/or any other transmission device. The wireless earbud system 100 may include a left earbud 1002a and a right earbud 1002b. Each earbud may perform operations described in FIG. 7 and/or include components described in FIG. 6.

Figure 10B:
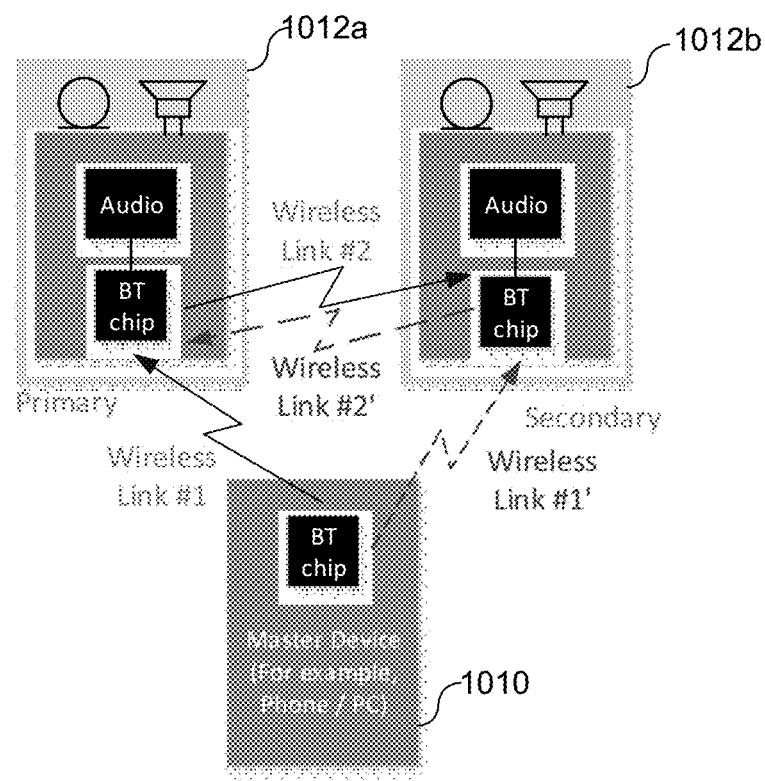
FIG. 10b illustrates another example earbud system in accordance with some embodiments.

FIG. 10b illustrates another example earbud system in accordance with some embodiments. In this example, the earbud system includes Bluetooth chips for the concurrent wireless transmission. As shown, in the first time period, the master device 1010 can transmit data over a wireless link #1 to the left earbud 1002a, which assumes the role of the primary device in the first time period. In the first time period, the left earbud 1002a can forward data and/or control information to the right earbud 1002b over a wireless link #2. In the second time period, the left earbud 1002a and the right earbud 1002b switch their roles; and the master device 1010 can transmit data over a wireless link #1' to the right earbud 1002b, which assumes the role of the primary device in the second time period. In the second time period, the right earbud 1002b can forward data and/or control information to the left earbud 1002a over a wireless link #2'.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computing system 600 can implement the techniques described herein using customized hard-wired logic, one or more ASICs or FPGAs, firmware and/or program logic which in combination with the computer system causes or programs computing system 600 to be a special-purpose machine. According to some embodiments, the operations, functionalities, and techniques and other features described herein are performed by computing system 600 in response to processors 612 executing one or more sequences of one or more instructions contained in, respectively, memory 614. Such instructions can be read into memory 614 from another storage medium, such as storage device 616. Execution of the sequences of instructions contained in memory 614 cause processors 612 to perform the process steps described herein, such as method 500 of FIG. 5. In alternative embodiments, hard-wired circuitry can be used in place of or in combination with software instructions.

The term "non-transitory media" as used herein refers to any non-transitory media for storing data and/or instructions that cause a machine to operate in a specific fashion. Such non-transitory media can comprise non-volatile media and/or volatile media. Non-volatile media can include, for example, optical or magnetic devices, such as storage device 616. Volatile media can include dynamic memory, such as memory 614. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Communication interface 618 can provide a bi-directional data communication. The interface may include circuitries that interface with, for example, power amplifiers 140, 150, and 340, as well as low noise amplifier 180. The circuitries may include, for example, frequency converters (e.g., mixers), analog-to-digital converters, symbol encoders and decoders, etc.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are illustrated in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A wireless device configured to receive data from a transmission device, the wireless device comprising:
   a communication component configured to wirelessly communicate with the transmission device and a peer wireless device, wherein the wireless communication with the transmission device comprises receiving data from the transmission device and communicating control information with the transmission device, and wherein the wireless communication with the peer wireless device comprises:
   transmitting data received from the transmission device to the peer wireless device,
   receiving data from the peer wireless device, and
   communicating control information with the peer wireless device;
   a storage component configured to store a first identification and a second identification for the wireless device;
   a data processing component configured to process data received from the transmission device and data received from the peer wireless device; and
   a control component configured to control the wireless communication with the transmission device and the peer device by the communication component, wherein the controlling of the wireless communication with the transmission device and the peer device by the control component comprises:
   alternatively switching between the first identification and the second identification as a communication identification to receive the data from the transmission device.

2. The wireless device of claim 1, wherein the first identification indicates to the transmission device an address of a primary device and the second identification indicates to the transmission device an address of a secondary device.

3. The wireless device of claim 1, wherein in a first time period the control component is further configured to control the communication component to communicate to the transmission device control information regarding data transmission with the transmission device in the first time period.

4. The wireless device of claim 1, wherein in a second time period the control component is further configured to control the communication component not to communicate to the transmission device control information regarding data transmission with the transmission device.

5. The wireless device of claim 1, the control information communicated to the peer wireless device includes information indicating to the peer wireless device that the wireless device uses the first identification as the communication identification with the transmission device.

6. The wireless device of claim 1, wherein the transmission device is a smart phone or a laptop.

7. The wireless device of claim 1, wherein the wireless device and the peer wireless device are a pair of wireless ear-phones.

8. The wireless device of claim 7, wherein the transmission device is a wireless transmitter.

9. The wireless device of claim 1, wherein the peer wireless device is a first peer wireless device, wherein the storage component is further configured to store a third identification, and wherein the controlling of the wireless communication with the transmission device and the peer device by the control component further comprises: using the third identification as the communication identification to receive data from the second peer wireless device.

10. A method of receiving data from a transmission device using a wireless device, the method comprising:
  wirelessly communicating with a transmission device and a peer wireless device, wherein the wireless communication with the transmission device comprises receiving data from the transmission device and communicating control information with the transmission device, and wherein the wireless communication with the peer wireless device comprises:
  transmitting data received from the transmission device to the peer wireless device,
  receiving data from the peer wireless device, and
  communicating control information with the peer wireless device;
  storing a first identification and a second identification for the wireless device;
  processing data received from the transmission device and data received from the peer wireless device; and
  controlling the wireless communication with the transmission device and the peer device by the communication component, wherein the controlling of the wireless communication with the transmission device and the peer device by the control component comprises:
  alternatively switching between the first identification and the second identification as a communication identification to receive the data from the transmission device.

11. The method of claim 10, wherein the first identification indicates to the transmission device an address of a primary device and the second identification indicates to the transmission device an address of a secondary device.

12. The method of claim 10, wherein the method further comprises: in a first time period controlling the communication component to communicate to the transmission device control information regarding data transmission with the transmission device in the first time period.

13. The method of claim 10, wherein the method further comprises: in a second time period controlling the communication component not to communicate to the transmission device control information regarding data transmission with the transmission device.

14. The method of claim 10, the control information communicated to the peer wireless device includes information indicating to the peer wireless device that the wireless device uses the first identification as the communication identification with the transmission device.

15. The method of claim 10, wherein the transmission device is a smart phone or a laptop.

16. The method of claim 10, wherein the wireless device and the peer wireless device are a pair of wireless earphones.

17. The method of claim 16, wherein the transmission device is a wireless transmitter.

18. The method of claim 10, wherein the peer wireless device is a first peer wireless device, wherein the method further comprises storing a third identification, and wherein the controlling of the wireless communication with the transmission device and the peer device by the control component further comprises: using the third identification as the communication identification to receive data from the second peer wireless device.

* * * * *